United States Patent
Helle et al.

(10) Patent No.: US 9,604,735 B2
(45) Date of Patent: Mar. 28, 2017

(54) METHOD AND DEVICE FOR TESTING A COMPONENT PART OF AN AIRCRAFT

(71) Applicant: AIRBUS SAS, Blagnac (FR)

(72) Inventors: Philipp Helle, Hamburg (DE); Wladimir Schamai, Hamburg (DE)

(73) Assignee: Airbus SAS, Blagnac (FR)

( * ) Notice: Subject to any disclaimer, the term of this patent is extended or adjusted under 35 U.S.C. 154(b) by 359 days.

(21) Appl. No.: 14/283,543

(22) Filed: May 21, 2014

(65) Prior Publication Data

US 2014/0366657 A1 Dec. 18, 2014

(30) Foreign Application Priority Data

Jun. 12, 2013 (DE) .................... 10 2013 106 120

(51) Int. Cl.
*G01M 17/00* (2006.01)
*B64F 5/00* (2006.01)

(52) U.S. Cl.
CPC ........... *B64F 5/0045* (2013.01); *G01M 17/00* (2013.01)

(58) Field of Classification Search
CPC .............................. B64F 5/0045; G01M 17/00
USPC ..... 701/3, 30.5, 30.9, 30.7, 30.8, 31.1, 33.8, 701/33.9
See application file for complete search history.

(56) References Cited

U.S. PATENT DOCUMENTS

| | | | | |
|---|---|---|---|---|
| 3,283,229 A * | 11/1966 | Lindahl | ................ | G05D 1/0808 318/448 |
| 3,688,099 A * | 8/1972 | Buscher | ............... | G05D 1/0077 244/195 |
| 3,882,406 A * | 5/1975 | Graves | .................. | B64C 13/503 327/71 |
| 3,898,621 A * | 8/1975 | Zelinski | .............. | G06F 11/1641 714/11 |
| 3,983,329 A * | 9/1976 | Rock | ....................... | G06F 7/026 340/146.2 |
| 4,115,847 A * | 9/1978 | Osder | ................... | B64C 13/503 244/194 |
| 5,222,065 A * | 6/1993 | Krogmann | ............... | G05B 9/03 714/38.12 |

(Continued)

FOREIGN PATENT DOCUMENTS

DE        690 28 872        2/1997

*Primary Examiner* — Tyler J Lee
(74) *Attorney, Agent, or Firm* — Nixon & Vanderhye P.C.

(57) ABSTRACT

A method for testing a component part of an aircraft comprises the steps of determining at least one first test value of the component part of the aircraft and/or at least one first test value of a comparable component part of a further aircraft for at least one test parameter, inputting the first test parameter and the first test value into a pattern recognition system, which produces an inner correlation between the first test parameter and the first test value. The method further comprises the steps of defining at least one second test parameter, inputting the second test parameter into the pattern recognition system in order to determine a second test value by means of the inner correlation, checking whether the second test value falls within the predefined value range, and determining a third test value of the component part of the aircraft for the second test parameter if the second test value falls within the predefined value range. The invention further relates to a device for testing a component part of an aircraft.

20 Claims, 4 Drawing Sheets

(56) References Cited

U.S. PATENT DOCUMENTS

| | | | | |
|---|---|---|---|---|
| 5,238,203 | A | * | 8/1993 | Skonieczny ......... G05D 1/0858 244/17.13 |
| 5,335,177 | A | * | 8/1994 | Boiteau ............... G06F 11/1497 244/195 |
| 5,586,066 | A | * | 12/1996 | White .................. G05B 23/024 700/80 |
| 5,774,376 | A | | 6/1998 | Manning |
| 5,874,672 | A | | 2/1999 | Gerardi |
| 6,098,186 | A | * | 8/2000 | Rivoir ................ G01R 31/3183 714/735 |
| 9,151,786 | B2 | * | 10/2015 | Moiseev .................. G05B 9/03 |
| 2006/0061368 | A1 | | 3/2006 | Furse et al. |
| 2011/0178967 | A1 | | 7/2011 | Delp |

* cited by examiner

METHOD AND DEVICE FOR TESTING A COMPONENT PART OF AN AIRCRAFT

This application claims priority to German Patent Application No. 10 2013 106 120.6 filed 12 Jun. 2013, the entire contents of which are hereby incorporated by reference.

BACKGROUND OF THE INVENTION

1. Field of the Invention

The invention relates to a method for testing a component part of an aircraft, in which at least one first test value of the component part of the aircraft is determined. The invention also relates to a device for testing a component part of an aircraft, said device comprising a measuring arrangement which is suitable for determining at least one test value for at least one first test parameter.

2. Discussion of Prior Art

Component parts of an aircraft, such as structural elements or systems or groups of systems, which are required for the functional capacity of the aircraft, are tested during development or as a matter of routine. The more relevant such a component is to safety, the more comprehensive are the test protocols. In particular, the number of test parameters rises here in order to achieve the most comprehensive and reliable result possible in terms of the functional capacity of the component part. It has been found that the selection of the test parameters is key for the test result and the validity of the test result.

An example of a component part of an aircraft may be the power supply of the aircraft. The power supply is composed of one or more current sources, consumers and a distribution system. The distribution system comprises cables and junction points. The consumers are connected to the cables and can be provided with a battery or a capacitor in order to bridge short power failures. If the functional capacity of the entire power supply or a part thereof is to be tested, amperages or voltages applied to a specific location of the cable are thus considered as test parameters. These applied amperages or voltages can be used to test the power supply for interference currents or interference voltages. A large number of interference points and therefore test parameters are revealed merely on the basis of the length of the cables in an aircraft. Further, a test parameter may be an externally induced interruption of power at a specific location. Furthermore, the amperage at a consumer or the functional capacity thereof can be considered as a test value.

A test may therefore be, for example, the amperage of the cable applied to the location X of the cable (test parameter T1), an interruption at the location Y of the cable (test parameter T2) and the amperage applied to the consumer V1 (test parameter T3). Test values, which can be determined on the basis of the test parameters T1, T2 and T3, are, for example, the actual amperage at the location X (test value TW1) and the amperage at the consumer V1 (test value TW2). For example, a test result is whether or not the network has a fault. This can be determined from the test values.

Many such test parameters and test values ought to be determined due to the size of the power supply of the aircraft (for example the length of the cables and possible interruption points). This is not possible for time and cost reasons, and therefore the test of the power supply is limited to relevant test parameters and test values. Test parameters can be determined by a random generator. This approach has the disadvantage that the determined test parameters and test values may not have the desired validity. Alternatively, tests can be carried out step-by-step. The efficacy of this approach however is highly dependent on the step increment, and the determination of the step increments is influenced by the experience of the tester.

In modern electronic component parts of an aircraft there are a large number of possible stimulation points (inputs) when testing said component parts. In order to rule out all potential faults of such a component part, it would be necessary to generate the full combination of value pairs for all inputs, to feed this to the component part and to check for fault-free behavior. This is not feasible in practice due to the high number of potential test parameter combinations. Pairwise testing however, which is used to reduce the inputs, is only effective for software tests, in which the majority of faults are dependent on just one input variable, as proven statistically.

DE 69028 872 T2 describes a method for diagnosing the operation of an electronic control system, without requiring a representation of the system in the form of detailed analytical model. Used for this purpose is a pattern recognition system, which uses data obtained by a data acquisition unit, for example data of an engine, to detect engine faults. US 2011/0178967 A1 is concerned with a diagnostic system that automatically analyzes test data to identify characteristics of a component production process. By means of a tester, measurements are made on a component part. US 2006/0061368 A1 discloses a method for determining a cable length or impedance, in order thereby to determine the functional capability of lines, for example in an aircraft. U.S. Pat. No. 5,874,672 A describes a method for measuring the distribution of ice on a surface of an aircraft. U.S. Pat. No. 5,774,376 A describes a method for monitoring, measuring or localizing structural damage to the mechanical structure, such as for example a wing of an aircraft.

SUMMARY OF THE INVENTION

The object of the invention is to provide an improved test of a component part of an aircraft.

This object is achieved by the method for testing a component part of an aircraft as claimed in claim 1 and also by the device for testing a component part of an aircraft as claimed in claim 12.

The invention relates to a method for testing a component part of an aircraft, comprising the following steps. In a step a) at least one first test value of the component part of the aircraft and/or at least one first test value of a comparable component part of a further aircraft is/are determined for at least one first test parameter, the test parameter being a specification for changing or manipulating the component part and the test value being the result of a measurement with the presence of a change or manipulation of the component part determined by the test parameter. In step b) the first test parameter and the first test value are input into a pattern recognition system, which produces an inner correlation between the first test parameter and the first test value, the inner correlation representing a linking of the first test parameter to the first test value. At least one second test parameter is defined in step c). In step d) the second test parameter is input into the pattern recognition system in order to determine a second test value by means of the inner correlation. It is checked in step d) whether the second test value falls within a predefined value range, and in step f) a third test value of the component part of the aircraft is determined for the second test parameter if the second test value falls within the predefined value range.

The component part, for example, may be a structural element of the aircraft or a system for controlling the aircraft itself or an element of the aircraft. A component part may also be composed of a group of a number of elements of the aircraft. For example, the component part is the above-mentioned power supply system.

Within the scope of this application, an aircraft is understood to mean all vehicles which are capable of flying, such as airplanes, helicopters or the like.

The test parameter is to be understood as a specification for changing or manipulating the component part. In the example of the power supply of the aircraft, this is additionally applied amperage at the location X of the cable (test parameter T1) and the additionally applied or changed amperage at the consumer V1 (test parameter T3). Further, the power interruption in a power supply at the location Y of the cable (test parameter TW2) is also an example for a test parameter. The test parameter can be changed for example by the precise point of the interruption, the moment in time of the interruption and/or the duration of the interruption. A further example of a manipulation would be the specification of an interference current source with the amperage I at the location Z of the cable.

The test parameter may be composed more preferably of a test parameter definition and a test parameter size. The test parameter definition specifies what can be changed at a component part. In the above-mentioned example of the power supply, the test parameter definition is the interruption at the location of the cable or the applied amperage itself. The test parameter size is the specific size or value which is used for a test parameter definition during the test. In the above-mentioned example of the power supply, this is the location X for the application of the amperage, that is to say the actual point of the change, and the location Y for the interruption of the cable. For the second test parameter, merely the test parameter sizes, that is to say the location X and the location Y in the above example, are changed, whereas the test parameter definition remains unchanged in the case of the second test parameter.

The test value is determined with use of the test parameters. A test value can be assigned to each test parameter. It is also possible however to assign a test value to a number of test parameters or all test parameters. The test value is therefore the result of a measurement with the presence of a manipulation of the component part determined by the test parameter.

In the example of the power supply of the aircraft, the test parameters constituted by interruption at the location Y of the cable (test parameter T2) and applied amperage at the consumer V1 (test parameter T3) are assigned to the test value constituted by amperage at the consumer V1 (test value TW2).

Within the scope of this application, the test result is preferably also added to the test value. In other words, the test value in particular comprises the actual results of the measurements during the manipulations determined by the test parameters and also the evaluation of one or more or all results. The test result, for example, is the functional capacity of a component part, this test result being composed of or being determinable from the individual measurement results. In the above-mentioned example of the power supply, the result of the measurement is the amperage at the location X or the amperage at the consumer V1. The test result, for example the functional capacity, can be determined on the basis of these results, for example in that the power supply does not function if an amperage at the consumer V1 is lower than a predefined value.

The first test value can be determined on the aircraft on which the method for testing the component part of the aircraft is carried out. Alternatively or additionally, the first test value can also be determined on a comparable component part of a further aircraft. The further aircraft may be an aircraft of the same type or model as the aircraft on which the method is used. A comparable component part in particular is a component part that is used for the same purpose in the further aircraft. Further, the comparable component part may be structurally or functionally identical, at least in part. For example, the comparable component part may be a component part that has been used previously in an aircraft, whereas the component part to be tested is a component part that has been further developed starting from the comparable component part. In this example the method is a method that is used when developing the component part. The comparable component part is preferably identical to the component part of the aircraft on which the method is used.

The first test parameter and the first test value are input into the pattern recognition system, which produces an inner correlation between the first test parameter and the first test value. This inner correlation may be a functional dependence, such as a function. Specifically in cases in which a number of test parameters, which may also be referred to as a test parameter set, are assigned to a test value, the inner correlation often cannot be described in a functional dependence, and therefore the inner correlation should be understood as a linking of the first test parameter to the first test value. In particular, it is only possible with difficulty for an outsider to know the inner correlation of the pattern recognition system. It is sufficient for the pattern recognition system to produce the inner correlation.

In step c) at least one second test parameter is defined. The second test parameter differs from the first test parameter, in particular in terms of a test parameter size. This means that a new test parameter is defined. This occurs in particular by changing the first test parameter, in particular the test parameter size. For example, the location of manipulation of the first test parameter is thus changed compared with the second test parameter. The second test parameter can be defined manually or by use of a machine. A number of second test parameters are preferably defined.

A set of second test parameters is preferably defined which can replace the set of first test parameters.

In the above-mentioned example of power supply, the first test parameters constituted by applied amperage at the location X of the cable (test parameter T1) and interruption at the location Y of the cable (test parameter T2) can be changed into second test parameters constituted by applied amperage at the location X1 of the cable (test parameter T1') and interruption at the location Y1 of the cable (test parameter T2').

In step d) this second test parameter is input into the pattern recognition system in order to determine a second test value. This second test value, in particular the test result, is compared with a predefined value range in order to thus determine whether the second test parameter, for methods for testing the component part of the aircraft, is more advantageous for the test compared with the first test parameter. The predefined value range may be, for example, part of a value range for which the fault probability of the component part is particularly high. Here, the predefined value range is a range of the possible results of the measurements.

A further example for the predefined value range may be all test values which correspond to a fault or non-functioning of the component part. The predefined value range may therefore be a range of the test result. A search can therefore be performed selectively for all those test values and therefore test parameters which lead to a fault of the component part in order to thus uncover as many faults of the component part as possible with a minimum number of tests to be performed.

In the above-mentioned example of the power supply, the predefined value range of the test value constituted by amperage at the consumer V1 (test value TW2) may be the amperages at which the consumer V1 could be damaged. This may also be understood as a test result. Test parameters that are particularly relevant for the functional capacity of the consumer V1 can therefore be determined.

In step f) the second test parameter is then actually used to test the component part. In particular, the component part is tested on the basis of the manipulation determined by the second test parameter. The second test parameter is only then used however if, in step e), the test value falls within the predefined value range, such that the second test parameter is of particular interest for the method for testing the component part. If the second test value does not fall within the predefined value range, the second test parameter is not used. Then, in particular, either the first test value is used more extensively, or new second test parameters are defined.

In the above-mentioned example of power supply, the third test values are the results which are determined on the basis of the test parameters constituted by applied amperage at the location X1 of the cable (test parameter T1') and interruption at the location Y1 of the cable (test parameter T2') and also the test value constituted by amperage at the consumer V1 (test parameter T3). In this case it has been assumed (determined by the pattern recognition system) that, for example, the location X1 for the test value of amperage at the consumer V1 (test value TW2) delivers a critical amperage at the consumer V1 compared with the location X. This is also true for the locations Y1 and Y of the test parameters T2' and T2. The third test value in this example is determined on the basis of a first test parameter (test parameter T3) and two second test parameters (test parameters T1' and T2').

If a number of second test parameters have been defined, each second test parameter is then used to determine the third test value of which the second test value was in the predefined value range.

It is further possible in step f) not only to carry out the actual test physically on the component part, but alternatively or additionally to determine the third test value by means of a simulation of the component part. This is of interest in particular when developing the component part.

It is preferable for steps a) to f) to be carried out in the specified order. The method for testing the component part is preferably applied repeatedly. By means of a repeated application, the inner correlation can be better determined, such that the selection of the second test parameter can be optimized in terms of the relevance for the test method. Alternatively, steps a) and b) can be carried out repeatedly. The more frequently steps a) and b) are carried out, the better the pattern recognition system can produce the inner correlation, that is to say the better it can be taught in. This can increase the predictive power of the method in steps d) and e).

The advantage of the method according to the invention is that the selection of the test parameters can be improved in terms of the test value to be tested. This has the desired effect in particular that the validity of the method is increased. This can be used to reduce the number of actual tests to be carried out, or can be used to carry out as many meaningful tests as possible in the available time. Fewer tests therefore have to be carried out for the quality check.

The method is advantageously directed to automatic testing. After each test run with a set of test parameters, the resultant test values in particular are used to adjust/to adapt the test focus for the next run.

The first test parameter and the first test value are preferably determined on an actual component part, whereas the third test value is determined on the basis of the second test value on a component part that is still being developed. This has the advantage that the validity of the test parameters of the test occurring during development can be optimized. Alternatively, first tests can be carried out on a simulation of the component part during development, such that fewer tests have to be carried out later on an actual component part. This then works in particular if the simulation is representative for the component part with respect to the planned test.

It is preferable if a plurality of first test values and/or a plurality of second test values is/are provided. At least one of the first test values and/or at least one of the second test values is preferably a mechanical and/or electrical measurement. In order to determine the third test value, at least one first test parameter is further preferably replaced by at least one second test parameter if the second test value falls within the predefined value range, the second test value being determined from the second test parameter which replaces the first test parameter, or from at least one first test parameter and the at least one second test parameter which replaces the first test parameter.

In the above-mentioned example of the power supply, the test values are the measurement of the amperage at the location X of the cable (test value TW1) and the measurement of the amperage at the consumer V1 (test parameter TW2).

A first test parameter can therefore be replaced by a second test parameter, the test parameter size preferably being replaced, whereas the test parameter definition remains unchanged. In the above-mentioned example of the power supply, the test parameters constituted by applied amperage at the location X1 of the cable (test parameter T1') and interruption at the location Y1 of the cable (test parameter T2') replace the first test parameters constituted by applied amperage at the location X of the cable (test parameter T1) and interruption at the location Y of the cable (test parameter T2). The locations of the manipulations of the power supply have thus been changed (applied amperage and interruption), that is to say merely test parameter sizes.

Alternatively, it is possible to replace a number of first test parameters by a second test parameter. The replacement then occurs if it is found, by checking whether the second test value falls within the predefined value range, that the second test parameter is equally as relevant or more relevant for the validity of the first test value compared with the one or more first test parameters.

The first test value and/or the second test value is/are preferably a mechanical and/or electrical measurement. This may mean that the component part is measured mechanically and/or electrically. This may be a strength measurement, an elongation measurement or oscillation measurement. Thermal conductance measurements may also be performed, in which the temperature at a location and also the quantity of heat fed at another location can be used as test parameters. An example of an electrical measurement is the amperage or the voltage in a network.

In the above-mentioned example of power supply, the test values of measurement of the amperage at the location X of the cable (test value TW1) and amperage at the consumer V1 (test value TW2) are electrical measurements.

The first test parameter and/or the second test parameter preferably comprise/comprises at least one component from the following group: extent of manipulation of the component part, location of manipulation of the component part, method of manipulation of the component part or duration of manipulation of the component part.

The extent of manipulation can be understood to mean the physical extent to which the component part is to be changed. An example of this is the amperage or the voltage which is applied to the component part, these being examples for test parameter definitions. The location of manipulation for example may be the point at which the amperage and/or the voltage is/are changed. This is also an example of a test parameter size. The duration of the measurement may be considered as the period of time for which the manipulation is performed.

By way of example, the voltage during a voltage measurement of a circuit (test value) can be interrupted over a long period of time or a short period of time, which corresponds to a change of the test parameter size. By lengthening the power interruption (second test parameter) compared with a shorter interruption (first test parameter), it is possible to check whether the component part is also functional in the event of a longer interruption.

For example, the method of manipulation may be one of a number of different manipulation methods. By way of example, a structural element of the aircraft may be deformed over the entire length of the element or at part of the element. This would correspond to the two different manipulation methods.

The pattern recognition system may be formed as a neural network.

Neural networks are known in the literature, and therefore will not be discussed in greater detail here. It is merely mentioned that in particular a multi-layer neural network is particularly suitable for the method. The neural network recognizes the inner correlation between the test parameter, which in particular corresponds to the input of the neural network, and the test value, which preferably corresponds to the output of the neural network. By inputting test parameter/test value pairs, the neural network can be trained, such that, when inputting a newly defined second test parameter of the test values originating from the neural network, it preferably comes closer and closer to the third test value (the actual test value). The validity of the second test parameter can thus be better predicted, and therefore the selection of the test parameters can be improved.

The training of the neural network is dependent for example on the activation function of the junction points of the neural network. In particular, measurements of the other aircrafts, that is to say routine measurements already carried out, are used to train the neural network. In particular, these are measurements on the component part of an earlier version and an earlier aircraft type. The training of the neural network is also particularly effective with functionally like component parts, for example if the component parts have the same input and output.

It is preferable if, in step c), the second test parameter is defined randomly or in a manner based on a stochastic distribution.

The term "randomly" means that the second test parameter, in particular the second test parameter size, is picked randomly from the number of test parameters that are possible for the component part. By way of example, if the location of manipulation is a test parameter, the number of possible test parameters is all locations at which the component part can be changed. The location for the second test parameter is then selected randomly. This has the advantage that the second test parameter is selected arbitrarily, such that there is a probability that the new, previously unconsidered test parameter will be checked in order to ascertain whether it is relevant for the validity of the test value. What is known as a selection bias of a person involved in the method can be avoided by a random selection of the second test parameter. The second test parameter is preferably generated by a random device.

When defining the second test parameter on the basis of a stochastic distribution, a weighting in terms of the newly defined second test parameters can be performed from the number of possible test parameters. This occurs by means of the adaptation of the stochastic distribution. For example, test parameters which have already proven to be particularly relevant for the method can thus be classified as more likely than test parameters with which previous tests did not determine particularly high validity. This provides the advantage that second test parameters are used more frequently in a range of the test parameters that is of particular interest for the test value. This may be useful with a quicker optimization of the method.

In the above-mentioned example of the power supply, the test parameter T1 is changed by a random change of the location X to X1.

Before step c), the centerpoint of a cluster of first test parameters or of first test values is preferably formed, the centerpoint preferably being used as a starting point for the definition of the second test parameter. Alternatively, the first test values which fall within the predefined value range are used as starting points for the definition of the second test parameter. If the centerpoint of a cluster of first test values is determined, the test parameter corresponding to the first test value is preferably determined and is used as a starting point.

A cluster may be the accumulation of the first test parameters or the first test values in an arbitrary, in particular mathematical space, in which the first test parameters or the first test values are located. A measurement of a mechanical stress of a component part may be an example of the cluster of first test parameters, the stress being measured at a number of geometrically close points.

Those test values that represent similar fault messages, that is to say those with which the test result is similar, can be understood to be a cluster of first test values. This is suitable for the discovery of the accumulations of faults. The centerpoint of such a cluster can be established by stochastic means (for example the average value or the median) in the space relevant for the test parameter or the test values. This centerpoint is then used as a starting point for the definition of the second test parameter. In particular, the centerpoint is to be the starting point with the random or stochastic determination of the second test parameter. To this end, the random or stochastic selection can be referred to as the distance from the starting point by way of example.

Alternatively, those first test values that fall within the predefined value range can be used as starting points. That which is described above will also apply here for the starting point. All the values of the first test values that correspond to a fault of the component part may be an example for the predefined value range. In this case, this means that the starting point in the presumed fault range of the first test values is adopted. This has the advantage that further test parameters in the space of the first test values relevant for the test method are used. The corresponding test parameter(s) that is/are then used as the actual starting point for the definition of the second test parameter is/are preferably assigned to this first test value, which is used as a starting point.

Step c) may be provided by a genetic algorithm, the second test parameter being generated from the combination of two or more first test parameters, the type and manner of the combination further being performed randomly.

Genetic algorithms are known from the literature. These known algorithms are used here to define second test parameters. To this end, two or more first test parameters in particular are combined. Similarly to a genetic mutation, the type and manner of the combination can be carried out randomly, that is to say random changes can be performed. Alternatively, the method of the combination can be changed randomly for the definition of a second test parameter, such that each second test parameter is generated from a different combination of two or more first test parameters.

The predefined value range is preferably a range of a probability distribution which specifies the probability for a fault of the component part according to the second test parameter, the probability for a fault for the predefined value range preferably being greater than 80%, in particular greater than 90%, and/or is less than 20%, in particular less than 10%.

The predefined value range is then in particular a range of a probability distribution if the test value, in particular the test result, reflects a function probability of the component part. This is then the case in particular if the test value is composed of a plurality of first test parameters. The established test value then reflects the probability that the component part is susceptible to faults. The pattern recognition system can then establish, on the basis of the new second test parameters, a second test value that reveals the functionality of the component part. In order to be able to classify the second test value, all of the second test parameters are preferably used that lead to a second test value which indicates a particularly high susceptibility of the component part to faults or which indicates a particularly low susceptibility of the component part to faults. A test value which is significantly linked to the functionality of the component part (high probability of a fault) is suitable for finding second test parameters which are more valid for the functionality of the component part than the previously used first test parameters.

The value ranges for example are helpful for focusing the method not on found fault zones, but also for testing away from the fault zones in order to discover any fault zones not found previously. For example, the user can thus specify that the tests to be carried out ultimately are to consist in a proportion of 80% of tests from which the system assumes that faults are generated and in a proportion of 20% of tests from which the system assumes that no faults are generated. This prevents "blinkers" and an exclusive focusing on faults already found.

The component part may be a control arrangement, in particular a control arrangement for an ambient control system of a cabin of the aircraft or a control arrangement for steering the aircraft. The first test parameter and/or the second test parameter may comprise/comprises at least one element from the following group: external temperature, internal temperature in the cabin, altitude of the aircraft, aircraft weight, or center of gravity of the aircraft.

An ambient control system of a cabin of the aircraft can be understood to mean a system that is responsible for controlling the temperature, the air moisture and/or the pressure in the aircraft. This is sometimes also referred to as an air conditioning system. For example, a control arrangement for steering the aircraft may be understood to mean a flight-by-wire flight control system, in which the inputs of a pilot are converted at the control elements (for example at the sidestick) in the case of flight-by-wire into electrical signals which are then converted in turn into movements of the control surfaces by servomotors or hydraulic cylinders, which are controlled by means of electric valves.

The aforementioned elements in particular are test parameter definitions, the associated test parameter sizes preferably being changed during testing, that is to say for example the level of the external temperature, the level of the internal temperature, etc.

The first test parameter or the plurality of first test parameters and/or the second test parameter or the plurality of second test parameters is/are then particularly relevant for the testing of these aforementioned component parts. For example, the functional capacity of the control arrangement as a whole (that is to say the test result) or the behavior of the control arrangement with amendment of the above-mentioned test parameters (that is to say the individual results of the tests) can be cited as a test value in respect of these test parameters.

The component part may be a power supply arrangement, which provides power at various supply points in the cabin and/or at a kitchen of the aircraft. The first test parameter and/or the second test parameter may comprise/comprises at least one element from the following group: moment of connection of the power consumption at a supply point, moment of disconnection of the power consumption at a supply point, power consumer at a supply point, number of interruptions of the power supply between two supply points, or the duration of the interruptions of the power supply between two supply points.

Such a power supply arrangement can be used for example to provide power to the passengers or the cabin crew at passenger seats and in aircraft kitchens. Further, the power supply arrangement can be used to supply power to further component parts, for example a water valve. A supply point may also be a connection of a consumer, for example the consumer V1 in the above-described example.

The aforementioned elements in particular are test parameter definitions, the associated test parameter sizes preferably being changed during testing, that is to say for example the actual moment of connection and disconnection, the number of interruptions, etc.

The above-mentioned test parameters have proven to be particularly suitable for the method for testing a power supply arrangement. The test value of such a test method may be, for example, the functional capacity of the power supply arrangement. This functional capacity can be checked on the basis of the above-mentioned test parameters. Further, the actual flow of current in the power supply arrangement can also be tested using the method. The number of test parameters can be reduced by the selection of the test parameters by means of the method described here, the test value to be established being determinable simultaneously with a similar validity.

The component part may be an electrically operated component part, in particular a valve. The first test parameter and the second test parameter may comprise the moment of interruption of the power supply of the valve and/or the number of power interruptions and/or the duration of the power interruptions and/or the interval between two power interruptions.

In the case of the above-mentioned electrically operated component part, the functional capacity of the electrically operated component part can be tested on the basis of the listed test parameters if the power supply is interrupted. This can occur for example when the aircraft lands or takes off. By means of the test method, the extent to which the electrically operated component part is functional in spite of the power failure can now be checked. With the aid of the method, the number of required test parameters can be significantly reduced.

The mentioned examples are test parameter definitions in particular, the associated test parameter sizes preferably being changed during testing, that is to say for example the exact moment of interruption, the number of interruptions, etc.

The invention is further directed to a device for testing a component part of an aircraft. The device comprises a measuring arrangement, which is suitable for determining at least one first test value for at least one first test parameter, the test parameter being a specification for changing or manipulating the component part and the measuring arrangement determining the test value with the presence of a change or manipulation of the component part determined by the respective test parameter. The device further comprises a pattern recognition system, which is suitable for producing an inner correlation between the first test value and the first test parameter, the inner correlation representing a linking of the first test parameter to the first test value, and for generating a second test value from a second test parameter by means of the inner correlation. The device additionally comprises a test parameter definition arrangement, which defines the second test parameter, and a selection arrangement, which is suitable for dividing a second test value into classes. The measuring arrangement determines a third test value on the basis of the second test parameter if the second test value falls within a predefined one of the classes.

The test parameter definition arrangement can be used, before the test is started, to define all test parameters.

The advantages and effects described with respect to the method also apply with respect to the device. The selection arrangement divides the second test value into classes. The predefined one of the classes in particular corresponds to the predefined value range.

The measuring arrangement preferably determines the first test value and/or the third test value by a mechanical and/or electrical measurement. Optical and magnetic measurements are furthermore also possible.

A plurality of first test parameters are preferably provided, the test parameter definition arrangement preferably defining a plurality of second test parameters. The selection arrangement further preferably replaces at least one first test parameter by at least one second test parameter if the second test value falls within the predefined class, the pattern recognition system determining the second test value from the second test parameter which replaces the first test parameter, or from at least one first test parameter and the at least one second test parameter which replaces the first test parameter.

The considerations mentioned with respect to the method also apply here. The first test parameter and/or the second test parameter may comprise/comprises at least one component from the following group: extent of manipulation of the component part, location of manipulation of the component part, method of manipulation of the component part, or duration of manipulation of the component part.

The pattern recognition system is may be formed as a neural network.

The test parameter definition arrangement may comprise a random device which defines the second test parameter randomly or on the basis of a stochastic distribution. The test parameter definition arrangement further may comprise an analysis arrangement which forms the centerpoint of a cluster of first test parameters or of first test values, the centerpoint being used as a starting point for the definition of the second test parameter, or the first test values which fall within the predefined class can be be used by the test parameter definition arrangement as a starting point for the definition of the second test parameter.

BRIEF DESCRIPTION OF THE DRAWINGS

The invention will be characterized in greater detail hereinafter on the basis of exemplary embodiments. In the schematic drawings

DETAILED DESCRIPTION OF EMBODIMENTS

Figure 1:
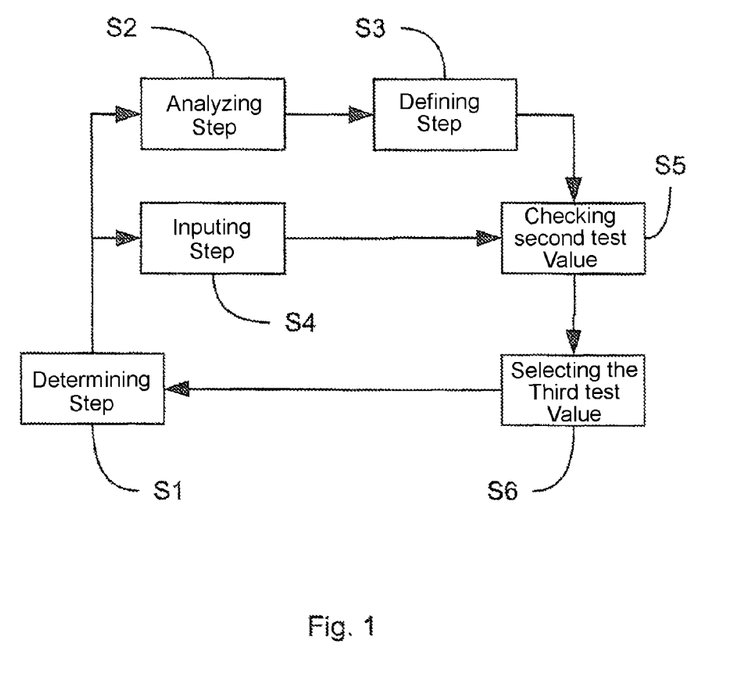
FIG. 1 shows a block diagram which defines an embodiment of the method.

The block S1 in FIG. 1 stands for a step in which a component part 10 of an aircraft 40 is tested. For this test, first test parameters are used which deliver at least one first test value. The step S1 corresponds to step a). The at least one first test parameter and the at least one first test value are then analyzed in step S2. This occurs here by clustering of the test values. In other words, test values are grouped to form clusters. Here, the clustering is implemented in accordance with test results, such as fault messages or warning messages. A new starting point for a new, second test parameter is determined on the basis of the centerpoint of the cluster of the test values. The starting test value thus obtained is recalculated into test parameters. In step S3, which corresponds to step c) in claim 1, the second test parameter is defined by this starting point. This occurs randomly. The chance determines the distance of the second test parameter from the starting point test parameter. Alternatively, the second test parameter can be established by fixed steps with predefined step increments proceeding from the starting point.

After step S1, step S4 is also performed simultaneously with steps S2 and S3. In step S4, which corresponds to step b) in claim 1, the first test parameter and the first test value are input into a pattern recognition system. The pattern recognition system then produces an inner correlation between the first test parameter and the first test value. This step can also be referred to as a learning step.

In step S5 this inner correlation is used to determine a second test value on the basis of the second test parameter. This corresponds to step e) in claim 1. In step S6 all those second test parameters from the plurality of second test parameters generated in step S3 of which the second test value established in step S5 falls within the predefined value range are then selected. This corresponds to step e) in claim 1. These second test parameters thus determined are then used in a new test method in step 1 as test parameters in order to determine the third test value.

Figure 2:
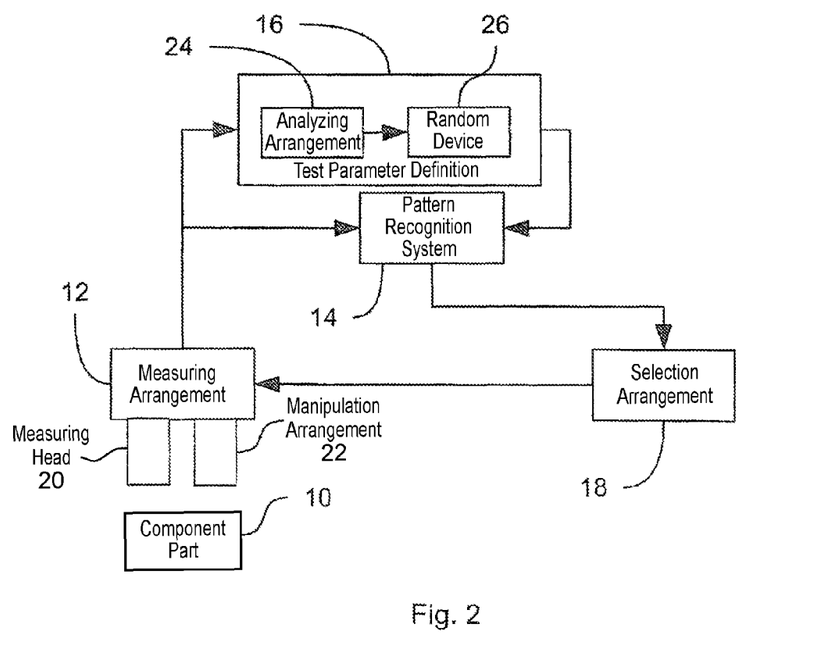
FIG. 2 shows a schematic illustration of a device for testing a component part of an aircraft.

A device for testing a component part 10 of an aircraft 40 comprises a measuring arrangement 12, a pattern recognition system 14, a test parameter definition arrangement 16 and a selection arrangement 18.

The measuring arrangement 12 has a measuring head 20, by means of which the measuring arrangement 12 can take measurements on the component part 10. The measuring arrangement 12 further has a manipulation arrangement 22, by means of which the measuring arrangement 12 can change the component part 10. The change is implemented in order to carry out a test with respect to the functional capacity of the component part 10. Further, the manipulation arrangement 22 may also change external factors which act on the component part 10, for example pressure, heat or applied voltage. The effect of changes to the component part 10 can then be determined by means of the measuring head 20. The test parameters are therefore used by the manipulation arrangement 22. The first test values are output by the measuring head 20 to the pattern recognition system 14 and to the test parameter definition arrangement 16.

The test parameter definition arrangement 16 comprises an analysis arrangement 24 and a random device 26. The analysis arrangement 24 determines the starting point, on the basis of which the second test parameter is defined by the random device 26. In the exemplary embodiment presented here, the analysis arrangement 24 forms the centerpoint of a cluster of first test values. The centerpoint is converted into the corresponding test parameters. The random arrangement 26, by means of a random generator, determines the distance from the test parameter that has been determined by the analysis arrangement 24. The starting point plus the distance is then the second test parameter.

The first test parameter and the first test value are input as inputs into the pattern recognition system 14. The pattern recognition system 14 determines the inner correlation between the first test value and the first test parameter. The inner correlation is then used in order to determine the second test value from the second test parameter which is input by the test parameter definition arrangement 16 into the pattern recognition system 14.

The second test value is then fed to the selection arrangement 18. This divides the second test value into a number of classes. If the second test value from the selection arrangement 18 falls within the predefined class as determined previously, the first test parameter is replaced by the second test parameter. The second test parameter is again fed to the measuring arrangement 12, which determines the third test value.

Figure 3:
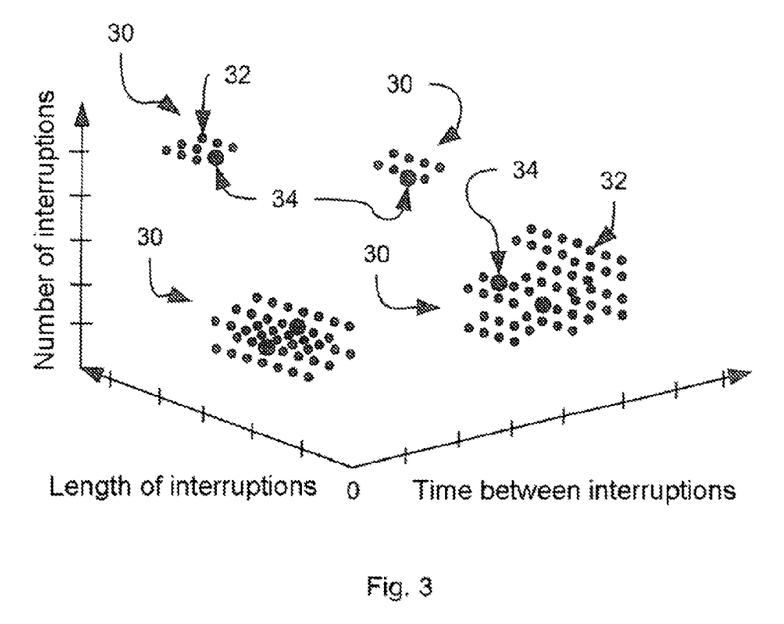
FIG. 3 shows a graph which presents test values according to test parameters.

A practical example, which is shown in FIG. 3, is a test method which was developed in order to simulate a component part 10 for fault simulation and to test said component part. The simulation is representative in terms of the test results. The test was a power supply interruption test, which is directed at testing the robustness of a system to be tested by implementing a number of power interruptions. The test parameters which characterize the power interruption are as follows: number of interruptions, duration of an individual interruption, and duration for which the system to be tested was connected before the first interruption occurred. More specifically, the test parameters (first test parameters) are as follows:

number of interruptions (test parameter definition) $\epsilon[1, 10]$, step size 1: (1; 2; 3; 4; 5; . . . 10;) (test parameter size)

interruption duration (test parameter definition) $\epsilon[1, 20]$, step size 5: (1; 6; 11; 16; 20;) (test parameter size)

time until first interruption (test parameter definition) $\epsilon[1, 20]$, step size 5: (1; 6; 11; 16; 20;) (test parameter size)

There are thus a total of 4,000 points or individual test parameter sets.

The test values are as follows:

| | |
|---|---|
| 0 | normal point |
| 1 | warning point, that is to say probable candidate for faults |
| 2 | fault point. |

A function test has the following results:
There are four fault zones 30 with:
6 faults
96 warnings The fault zones 30 are distributed in the space of the test values which are produced from the test parameters. The fault zones 30 are grouped around faults 34, around which warnings 32 are arranged. The warnings 32 and the fault points 34 are examples for first test values. The warnings 32 and the faults 34 are those first test values that fall within the predefined range. The predefined range in this exemplary embodiment therefore consists of faults and warnings.

The pattern recognition system can recognize the correlation between the first test parameter (number of interruptions . . . ) and the first test values. The centerpoint of a fault zone 30 can be used as a starting point. The new second test parameter can be defined by a random displacement from the starting point. The new second test parameter is input by the pattern recognition system in order to determine whether the second test value also lies within the fault zone 30. If the second test value 30 lies in the fault zone 30, the second test parameter corresponding to this second test value is used for the new test method.

Some exemplary embodiments will be presented briefly hereinafter.

Cabin Electrical Power System

Figure 4:
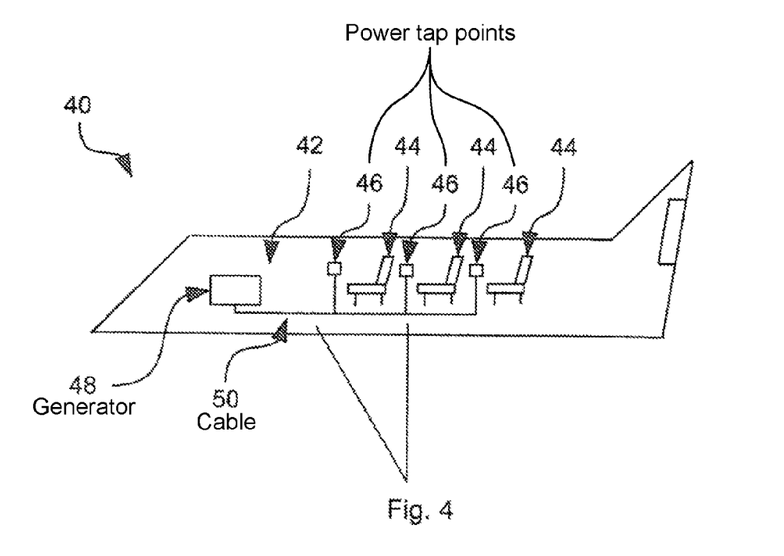
FIG. 4 shows a schematic illustration of the aircraft with an electrical power system.

The electrical power system 42 of an aircraft 40 shown in FIG. 4 is responsible for providing power at the passenger seats 44 and in the aircraft kitchen. The electrical power system 42 is an example of a power supply arrangement. The large number of different power tap points 46 and also the different load and the different load distribution per tap point result in a large state space in which testing must be performed. The power tap point 46 is an example of a supply point. The power is generated by a generator 48 and is fed via a cable 50 to the power tap points 46.

Test-Relevant Input Parameters:
moment of connection and disconnection of the consumers at the individual power tap points 46 (sockets)
load per power tap point 46 at moment in time t
Component test (valve, power interrupt test)

Figure 6:
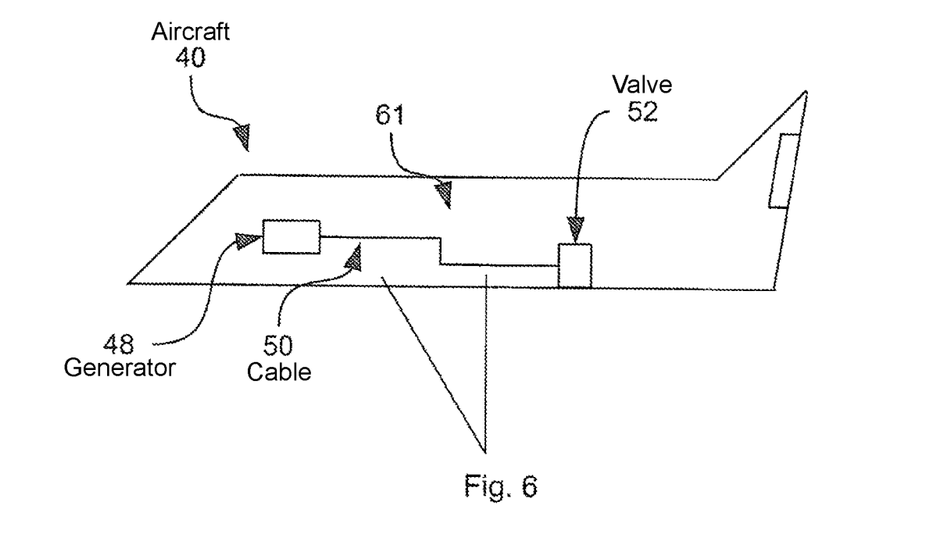
FIG. 6 shows a schematic illustration of the aircraft with a valve.

With an electrically operated and controlled valve 52, which is shown in FIG. 6, the behavior can be influenced by interruptions of the power supply during the take-off process. The valve 52 for example may control the airflow between a cabin 61 and the surroundings of the aircraft 40. The power supply is provided by a generator 48, which supplies the valve 52 with energy via the cable 50.

Figure 5:
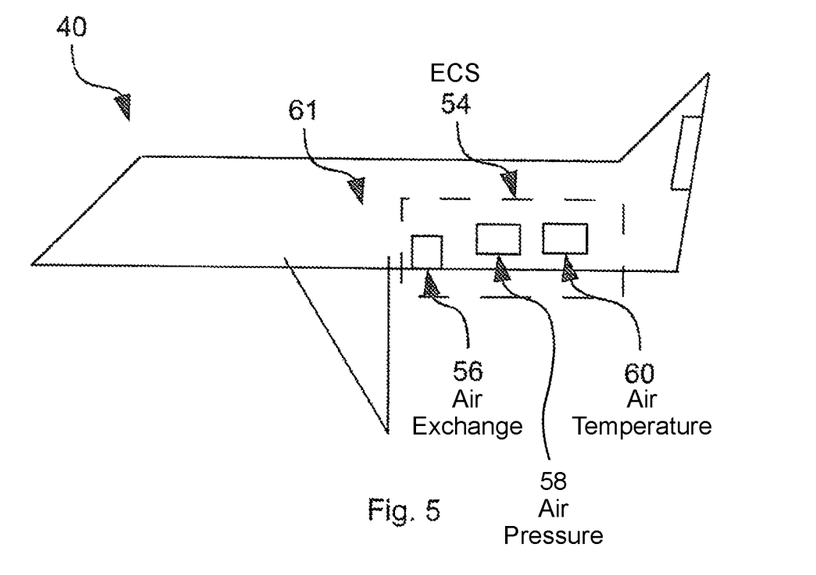
FIG. 5 shows a schematic illustration of the aircraft with an ambient control system.

Test-Relevant Input Parameters:
time until the first power interruption
number of power interruptions duration of a power interruption
time between the power interruptions
Air Conditioning System An air conditioning system, shown in FIG. 5, in aircraft 40 (environmental control system or ECS 54) comprises the following three system components: air exchange 56, pressure control 58 and temperature control 60 in the cabin 61 of the aircraft 40 for crew, passengers and luggage compartments. The air conditioning system is required in aircraft 40 in order to provide the necessary atmosphere in the cabin 61 at altitudes up to more than 11,000 meters and to provide the passengers with sufficient air pressure, a sufficient oxygen supply and an appropriate ambient temperature.

Compared with "normal" air conditioning systems only for temperature control, for example in buildings or vehicles, the use of this term for the ECS in aircraft is incomplete, because pressure and oxygen are also supplied here. The air conditioning systems in aircraft 40 therefore differ from the conventional air conditioning systems by a different design and energy source with much greater power demand and high safety requirements.

Figure 7:
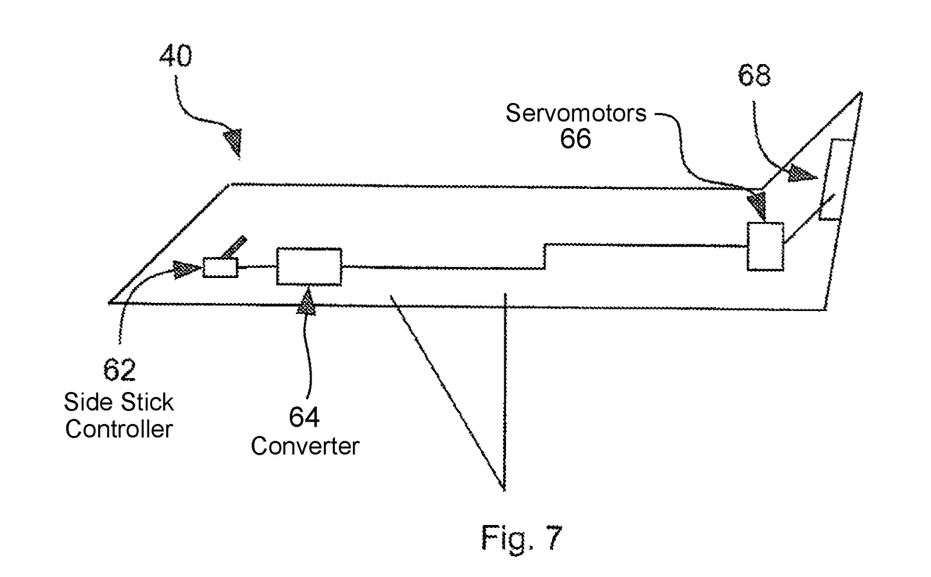
FIG. 7 shows a schematic illustration of the aircraft with a flight control system.

Test-Relevant Input Parameters:
number of passenger seats 44
degree of opening of the nozzle per passenger seat 44
external temperature
current internal temperature
target internal temperature
altitude
target cabin height (internal pressure)
(Fly-by-Wire) Flight Control System The flight control system shown in FIG. 7 is an example of a control arrangement for steering the aircraft 40. The inputs of the pilot at the control elements (for example at the sidestick 62) are converted in the case of fly-by-wire by means of a convertor 64 into electrical signals, which are then in turn converted into movements of the control surfaces 68 by servomotors 66 or by hydraulic cylinders, which are controlled by means of electric valves. This is necessary since, in the case of large or quick aircraft 40, the force to be applied by the pilot in order to move the control surfaces would be unreasonably large, or complex power transmissions would be uneconomical.

Test-Relevant Input Parameters:
(auto)pilot input (thrust, steering command, . . . )
angle of attack (flap setting)
aircraft weight
altitude
external temperature
current center of gravity Aspects of the invention will lastly be presented by way of example:

Methods from the field of machine learning/artificial intelligence, specifically neural networks and/or genetic algorithms, are linked with methods from the field of data mining/knowledge discovery from databases, specifically clustering, and existing methods for test parameter generation, specifically random data generation, for the adaptive testing.

On the condition that critical test parameters are usually to be found in groups in the entire test parameter space, optimized test parameters for the next test run can thus be generated starting from tests already performed. The starting point for the adaptive testing is always the definition of all possible stimuli for the tested system (system under test, SUT).

The uniqueness of the adaptive testing then becomes significant if first test values are already present. Should this not be the case, the adaptive testing then corresponds largely to the test method used for the generation of the new test parameters, that is to say without test values and with use of random generators for the generation of new test parameters, the adaptive testing corresponds to the random-based testing.

1. Analysis of the Test Data

The objective is to obtain starting points for the generation of new test parameter values. Various methods can be used for this purpose:
 clustering: test values are grouped into clusters. The new starting point may then be the centerpoint of a cluster, for example.
 fault points: all found fault points are a starting point 2. Generation of New Test Parameters New potential new test parameters are generated on the basis of the results of the test value analysis, starting from the previously established starting points. Various methods can be used for this purpose, for example:
 random: new values are generated in a purely randomized manner stochastic: new values are generated based on stochastic distributions (for example Gaussian distribution)
 step increments: new values are obtained by steps having predefined step increments 3. Learning and Prognosis Result data of tests that have already been carried out are used by a neural network in order to learn a decision function, which can perform a classification in output data automatically on the basis of the input data. For example, input data can be classified in output data classes, such as "no fault", "warning" or fault. The learnt decision function can then be used to automatically classify new input data. New test data are data that have not yet been used previously for learning. The accuracy of the classification is dependent on the structure of the neural network (for example monolayer or multi-layer network) and on the type of activation function (for example linear or non-linear). A good and useful approximation generally aspires for new test data to be classified with a low fault on the basis of training data already learnt. Put more simply, the trained neural network is used to make a prediction, for new test parameter values, with regard to which value combinations will likely lead to faults. This information is used in the next step to generate new suitable test parameters.

4. Selection of the Test Parameters

When generating new test parameters, a greater number of combinations are usually generated, in particular if a number of parameters are combined with the Cartesian product. Since it is not always possible to carry out thousands of tests, the final number of new test parameters can be reduced in this step. This can be achieved in accordance with different viewpoints:
 only parameters with high fault probability
 mixture of parameters with high and low fault probability
 absolute upper limits of the test parameter number Experiments have shown that, by the adaptive testing, fewer tests are sufficient in order to find just as many or more faults in a component as by the previously applied methods. Furthermore, the test parameter generation is nowadays also often carried out manually, whereas the adaptive testing is directed to automatic testing. After each test run with a set of test parameters, the resultant test values are used to adjust/to adapt the test focus for the next test run.

LIST OF REFERENCE SIGNS 10 component part
12 measuring arrangement 14 pattern recognition system
16 test parameter definition arrangement
18 selection arrangement
20 measuring head
22 manipulation arrangement
24 analysis arrangement
26 random device
30 fault zone
32 warning
34 fault
40 aircraft
42 electrical power system
44 passenger seat
46 power tap point
48 generator
50 cable
52 valve
54 ambient control system
56 air exchange
58 pressure control
60 temperature control
61 cabin
62 sidestick
64 converter
66 servomotor
68 control surface
S1 step 1
S2 step 2
S3 step 3
S4 step 4
S5 step 5
S6 step 6

The invention claimed is:

1. A method for producing inner correlations between test parameters and test values and for selecting test parameters for testing a component part of an aircraft, said method comprising the steps of:
   a) measuring, using at least one measurement arrangement, a first test value for a first test parameter of the component part of the aircraft, said first test parameter representing a specification for changing or manipulating the component part and said measuring first test value is performed during a change or manipulation of said component part corresponding to the first test parameter;
   b) automatically inputting said first test parameter and said first test value into a pattern recognition system, and producing an inner correlation between said first test parameter and said first test value, said inner correlation representing a relationship between said first test parameter and said first test value;
   c) defining at least one second test parameter of the component part of the aircraft using a test parameter definition procedure;
   d) automatically inputting said second test parameter into said pattern recognition system in order to determine a second test value, wherein the second test value is a predicted value based on the inner correlation;
   e) checking whether the second test value falls within a predefined value range; and
   f) measuring, using the at least one measurement arrangement, a third test value of said component part of the aircraft for the second test parameter when the second test value falls within the predefined value range.

2. The method as claimed in claim 1, wherein the first test value and/or the third test value is/are measured by a mechanical and/or electrical measurement, and in order to determine the third test value, the first test parameter further being replaced by the second test parameter if the second test value falls within the predefined value range, the second test value being determined from the second test parameter which replaces the first test parameter, or from the first test parameter and the second test parameter which replaces the first test parameter.

3. The method as claimed in claim 1, wherein the first test parameter and/or the second test parameter comprise/comprises at least one component from the following group: extent of manipulation of the component part, location of manipulation of the component part, method of manipulation of the component part or duration of manipulation of the component part.

4. The method as claimed in claim 1, wherein the pattern recognition system is formed as a neural network.

5. The method as claimed in claim 1, wherein, in step c), the test parameter definition procedure defines the second test parameter randomly or in a manner based on a stochastic distribution.

6. The method as claimed in claim 1, wherein the test parameter definition procedure includes
   before step c), forming the center point of a cluster of first test parameters or of first test values, the center point being used as a starting point for the definition of the second test parameter, or
   using the first test values which fall within the predefined value range as starting points for the definition of the second test parameter.

7. The method as claimed in claim 1, wherein step c) is provided by a genetic algorithm, the second test parameter being generated from the combination of two or more first test parameters, the type and manner of the combination further being performed randomly.

8. The method as claimed in claim 1, wherein the predefined value range is a range of a probability distribution which specifies the probability for a fault of the component part according to the second test parameter, the probability for a fault for the predefined value range being greater than 80%, or being less than 20%.

9. The method as claimed in claim 1, wherein the component part is a control arrangement, in particular a control arrangement for an ambient control system of a cabin of the aircraft or a control arrangement for steering the aircraft, the first test parameter and/or the second test parameter comprising: external temperature, internal temperature in the cabin, altitude of the aircraft, aircraft weight and/or center of gravity of the aircraft.

10. The method as claimed in claim 1, wherein the component part is a power supply arrangement, which provides power at various supply points in the cabin and/or at a kitchen of the aircraft, the first test parameter and/or the second test parameter comprising: the moment of connection of the power consumption at a supply point, the moment of disconnection of the power consumption at a supply point, the power consumption at a supply point, the number of interruptions of the power supply between two supply points, and/or the duration of the interruptions of the power supply between two supply points.

11. The method as claimed in claim 1, wherein the component part is an electrically operated valve, the first test parameter and/or the second test parameter comprising the moment of interruption of the power supply of the valve, the number of power interruptions, the duration of the power interruptions, and/or the interval between two power interruptions.

12. The method according to claim 1, further comprises automatically inputting the determined second test parameter and the third test value into the pattern recognition system to replace the first test parameter and the first test value respectively and produce another inner correlation between the first test parameter and first test value.

13. The method according to claim 1, wherein the steps a) to f) are performed in a specified order.

14. The method according to claim 1, wherein the steps a) to f) are carried out repeatedly to train the produced inner correlation and select further second test parameters.

15. The method according to claim 1, wherein the steps a) to b) are carried out repeatedly to train the produced inner correlation and select further second test parameters.

16. A device for producing inner correlations between test parameters and test values and for selecting test parameters for testing a component part of an aircraft, comprising
 a measuring arrangement, which is suitable for measuring a first test value for a first parameter, the first test parameter representing a specification for changing or manipulating the component part and the measuring arrangement measuring the first test value during a change or manipulation of the component part corresponding to the first test parameter,
 a pattern recognition system, which is suitable for producing an inner correlation between the first test value and the first test parameter, the inner correlation representing a relationship between the first test parameter and the first test value, and for generating a second test value from a second test parameter by predicting the second test value based on the inner correlation,
 a test parameter definition arrangement, which defines the second test parameter of the component part of the aircraft,
 a selection arrangement, which is suitable for dividing a second test value into classes,
 the measuring arrangement measuring a third test value on the basis of the second test parameter if the second test value falls within a predefined one of the classes.

17. The device as claimed in claim 16, wherein the measuring arrangement determines the first test value and/or the third test value by a mechanical and/or electrical measurement.

18. The device as claimed in claim 16, wherein a plurality of first test parameters are provided,
 the test parameter definition arrangement defining a plurality of second test parameters, and
 the selection arrangement further replacing at least one first test parameter by at least one second test parameter if the second test value falls within the predefined class, the pattern recognition system determining the second test value from the second test parameter which replaces the first test parameter, or
 the pattern recognition system determining the second test value from at least one first test parameter and the at least one second test parameter which replaces the first test parameter.

19. A method for producing correlations between test parameters and test values comprising:
 measuring a first test value of the component part of an aircraft wherein the first test value corresponds to a first test parameter representing a specification for changing or manipulating the component part, wherein the first test value is measured during a change or manipulation of the component part corresponding to the first test parameter;
 automatically inputting the first test parameter and the first test value into a pattern recognition system, and producing an inner correlation between the first test parameter and the first test value;
 defining a second test parameter of the component part of the aircraft using a test parameter definition procedure;
 automatically inputting the second test parameter into the pattern recognition system to produce a second test value, wherein the second test value is a predicted value based on the inner correlation;
 determining whether the second test value falls within a predefined value range; and
 in response to the determination that the second test value falls within the predefined value range, measuring a third test value of the component part of the aircraft, wherein the third test value corresponds to the second test parameter.

20. The method of claim 19, further comprises automatically inputting the determined second test parameter and the measured third test value into the pattern recognition system to replace the first test parameter and the first test value respectively and produce another inner correlation between the first test parameter and first test value.

* * * * *